(12) United States Patent
Desmons et al.

(10) Patent No.: US 7,667,589 B2
(45) Date of Patent: Feb. 23, 2010

(54) RFID TAG UNCOUPLING ONE OF ITS ANTENNA PORTS AND METHODS

(75) Inventors: Dimitri C. Desmons, Seattle, WA (US); Ronald A. Oliver, Seattle, WA (US); Christopher J. Diorio, Shoreline, WA (US); Todd E. Humes, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 652 days.

(21) Appl. No.: 10/891,894

(22) Filed: Jul. 14, 2004

(65) Prior Publication Data

US 2005/0212674 A1  Sep. 29, 2005

Related U.S. Application Data

(63) Continuation-in-part of application No. 10/812,493, filed on Mar. 29, 2004, now abandoned, and a continuation-in-part of application No. 10/815,474, filed on Mar. 31, 2004, now abandoned.

(51) Int. Cl.
G08B 19/00 (2006.01)

(52) U.S. Cl. ............... 340/522; 340/10.42; 340/572.1; 340/572.7; 340/572.5

(58) Field of Classification Search ............ 340/522, 340/10.42, 572.1, 572.7, 572.5
See application file for complete search history.

(56) References Cited

U.S. PATENT DOCUMENTS

| 4,315,272 A | 2/1982 | Vorhaus |
| 4,479,260 A | 10/1984 | Harrop |
| 4,584,709 A | 4/1986 | Kneisel et al. |
| 4,611,184 A | 9/1986 | Kumar |
| 4,730,188 A | 3/1988 | Milheiser |
| 4,742,567 A | 5/1988 | Ohe et al. |
| 4,783,783 A | 11/1988 | Nagai et al. |
| 4,809,009 A | 2/1989 | Grimes et al. |
| 4,857,893 A | 8/1989 | Carroll |
| 4,864,314 A | 9/1989 | Bond |
| 4,935,702 A | 6/1990 | Mead et al. |
| 4,953,157 A | 8/1990 | Franklin et al. |
| 4,977,616 A | 12/1990 | Linder et al. |

(Continued)

FOREIGN PATENT DOCUMENTS

EP    0 298 618    1/1989

(Continued)

OTHER PUBLICATIONS

International Search Report, for International Application No. PCT/US2005/009955, date mailed Jul. 12, 2005.

(Continued)

*Primary Examiner*—Daryl Pope
(74) *Attorney, Agent, or Firm*—Turk IP Law, LLC

(57) ABSTRACT

RFID tags have an on-chip antenna and an off-chip antenna. One of the antennas can become uncoupled if the proper signal is received, while the other antenna may still operate. The uncoupled antenna can be the larger one, for example the off-chip antenna. Then the tag can then be read only by the smaller antenna, which effectively reduces the range of the RFID tag, but without disabling it entirely.

55 Claims, 18 Drawing Sheets

U.S. PATENT DOCUMENTS

| | | |
|---|---|---|
| 5,068,668 A | 11/1991 | Tsuda et al. |
| 5,075,691 A | 12/1991 | Garay et al. |
| 5,142,292 A | 8/1992 | Chang |
| 5,175,418 A | 12/1992 | Tanaka |
| 5,280,286 A | 1/1994 | Williamson |
| 5,430,441 A | 7/1995 | Bickley et al. |
| 5,448,110 A | 9/1995 | Tuttle et al. |
| 5,499,397 A | 3/1996 | Wadin et al. |
| 5,507,035 A | 4/1996 | Bantz et al. |
| 5,528,222 A | 6/1996 | Moskowitz et al. |
| 5,572,226 A | 11/1996 | Tuttle |
| 5,719,586 A | 2/1998 | Tuttle |
| 5,771,021 A | 6/1998 | Veghte et al. |
| 5,805,632 A | 9/1998 | Leger |
| 5,825,329 A | 10/1998 | Veghte et al. |
| 5,842,118 A | 11/1998 | Wood, Jr. |
| 5,923,300 A | 7/1999 | Mejia |
| 5,929,760 A | 7/1999 | Monahan |
| 5,933,039 A | 8/1999 | Hui et al. |
| 5,939,945 A | 8/1999 | Thewes et al. |
| 5,952,922 A | 9/1999 | Shober |
| 5,995,048 A | 11/1999 | Smithgall et al. |
| 6,005,529 A | 12/1999 | Hutchinson |
| 6,025,784 A | 2/2000 | Mish |
| 6,043,746 A | 3/2000 | Sorrels |
| 6,045,652 A | 4/2000 | Tuttle et al. |
| 6,057,803 A | 5/2000 | Kane et al. |
| 6,060,815 A | 5/2000 | Nysen |
| 6,069,564 A | 5/2000 | Hatano et al. |
| 6,078,259 A | 6/2000 | Brady et al. |
| 6,078,791 A | 6/2000 | Tuttle et al. |
| 6,097,345 A | 8/2000 | Walton |
| 6,118,379 A | 9/2000 | Kodukula et al. |
| 6,130,570 A | 10/2000 | Pan et al. |
| 6,130,612 A | 10/2000 | Castellano et al. |
| 6,130,632 A | 10/2000 | Opris |
| 6,134,182 A | 10/2000 | Pilo et al. |
| 6,147,605 A | 11/2000 | Vega et al. |
| 6,147,655 A | 11/2000 | Roesner |
| 6,166,706 A | 12/2000 | Gallagher, III |
| 6,184,841 B1 | 2/2001 | Shober et al. |
| 6,215,402 B1 | 4/2001 | Kodukula et al. |
| 6,249,260 B1 | 6/2001 | Holloway |
| 6,266,362 B1 | 7/2001 | Tuttle et al. |
| 6,268,796 B1 | 7/2001 | Gnadinger et al. |
| 6,271,793 B1 | 8/2001 | Brady et al. |
| 6,281,794 B1 | 8/2001 | Duan et al. |
| 6,320,788 B1 | 11/2001 | Sansbury et al. ......... 365/185.1 |
| 6,340,932 B1 | 1/2002 | Rodgers et al. |
| 6,346,922 B1 | 2/2002 | Proctor et al. |
| 6,357,025 B1 | 3/2002 | Tuttle |
| 6,366,260 B1 | 4/2002 | Carrender |
| 6,366,629 B1 | 4/2002 | Chen et al. |
| 6,396,438 B1 | 5/2002 | Seal |
| 6,445,297 B1 | 9/2002 | Nicholson |
| 6,501,807 B1 | 12/2002 | Chieu et al. |
| 6,517,000 B1 | 2/2003 | McAllister et al. |
| 6,571,617 B2 | 6/2003 | Van Niekerk |
| 6,603,801 B1 | 8/2003 | Andren et al. |
| 6,677,917 B2 | 1/2004 | Van Heerden et al. |
| 6,700,491 B2 | 3/2004 | Shafer |
| 6,701,605 B2 | 3/2004 | Huffer et al. |
| 6,717,923 B1* | 4/2004 | Smith .................. 370/278 |
| 6,720,930 B2 | 4/2004 | Johnson et al. |
| D492,670 S | 7/2004 | Hung et al. |
| D493,446 S | 7/2004 | Hung et al. |
| 6,830,193 B2 | 12/2004 | Tanaka |
| 6,885,344 B2* | 4/2005 | Mohamadi ........... 343/700 MS |
| 7,005,968 B1* | 2/2006 | Bridgelall ............... 340/10.42 |
| 7,030,786 B2 | 4/2006 | Kaplan et al. |
| 7,123,171 B2 | 10/2006 | Kaplan et al. |
| 7,214,569 B2 | 5/2007 | Swindlehurst et al. |
| 2001/0043162 A1 | 11/2001 | Babb |
| 2002/0067315 A1 | 6/2002 | Kunysz |
| 2002/0075184 A1 | 6/2002 | Tuttle |
| 2002/0109636 A1 | 8/2002 | Johnson et al. |
| 2002/0126057 A1 | 9/2002 | King et al. |
| 2002/0167405 A1 | 11/2002 | Shanks et al. ............ 340/572.1 |
| 2002/0175805 A9 | 11/2002 | Armstrong et al. |
| 2003/0090313 A1 | 5/2003 | Burgener et al. |
| 2003/0184495 A1 | 10/2003 | Tomon |
| 2004/0001024 A1 | 1/2004 | Killen et al. |
| 2004/0075616 A1 | 4/2004 | Endo et al. |
| 2004/0113746 A1 | 6/2004 | Brindle |
| 2004/0125023 A1 | 7/2004 | Fujii et al. |
| 2004/0137844 A1 | 7/2004 | Desjeux et al. |
| 2004/0178265 A1 | 9/2004 | Bui et al. |
| 2004/0183743 A1 | 9/2004 | Reasoner et al. |
| 2005/0024186 A1 | 2/2005 | Friedrich |
| 2005/0028032 A1 | 2/2005 | Klein |
| 2005/0104789 A1 | 5/2005 | Hashidate et al. |
| 2005/0104793 A1 | 5/2005 | Yuanzhu |
| 2005/0104797 A1 | 5/2005 | McCollum |
| 2005/0134460 A1 | 6/2005 | Usami |
| 2005/0170784 A1 | 8/2005 | Ariyoshi et al. |
| 2005/0190111 A1 | 9/2005 | King et al. |
| 2005/0212674 A1 | 9/2005 | Desmons et al. |
| 2005/0225435 A1 | 10/2005 | Diorio et al. |
| 2005/0227631 A1 | 10/2005 | Robinett |
| 2005/0231434 A1 | 10/2005 | Azadegan et al. |
| 2005/0253688 A1 | 11/2005 | Fukuda |
| 2005/0259030 A1 | 11/2005 | Mizuno et al. |
| 2005/0269408 A1 | 12/2005 | Esterberg et al. |
| 2005/0270185 A1 | 12/2005 | Esterberg |
| 2005/0270189 A1 | 12/2005 | Kaplan et al. |
| 2006/0001579 A1 | 1/2006 | Noro et al. |
| 2006/0028379 A1 | 2/2006 | Oberle |
| 2006/0038724 A1 | 2/2006 | Tikhov et al. |
| 2006/0038725 A1 | 2/2006 | Tikhov et al. |
| 2006/0038730 A1 | 2/2006 | Parsche |
| 2006/0044192 A1 | 3/2006 | Egbert |
| 2006/0055620 A1 | 3/2006 | Oliver et al. |
| 2006/0109128 A1 | 5/2006 | Barink et al. |
| 2006/0139223 A1 | 6/2006 | Li et al. |
| 2006/0145926 A1 | 7/2006 | Choi et al. |
| 2006/0186995 A1 | 8/2006 | Wu et al. |
| 2006/0208897 A1 | 9/2006 | Chiu et al. |
| 2006/0208900 A1 | 9/2006 | Tavassoli Hozouri |
| 2006/0238301 A1 | 10/2006 | Wu et al. |
| 2006/0244676 A1 | 11/2006 | Uesaka |
| 2006/0262023 A1 | 11/2006 | Engargiola et al. |
| 2007/0024446 A1 | 2/2007 | Hyde et al. |
| 2007/0096993 A1 | 5/2007 | Tikhov et al. |
| 2007/0103379 A1 | 5/2007 | Garby et al. |
| 2007/0152901 A1 | 7/2007 | Hockey et al. |
| 2007/0205953 A1 | 9/2007 | Bombay et al. |

FOREIGN PATENT DOCUMENTS

| | | |
|---|---|---|
| EP | 0416264 A2 | 7/1990 |
| EP | 0 435 137 | 7/1991 |
| WO | 01 73854 | 10/2001 |
| WO | WO 2004/063982 A1 | 7/2004 |

OTHER PUBLICATIONS

"An Overview of the Serial Digital Interface," 1994, pp. 1-28, SGS-Thomson Microelectronics.

Junko Yoshida, EE Times, "RFID "kill" Feature Aims to Soothe Privacy Fears", Apr. 28, 2003.

Erika Jonietz, Technology Review, "Tracking Privacy", Jul./Aug. 2004, pp. 74-75.

International Search Report and Written Opinion, Application No. PCT/US2005/009949, dated Jul. 6, 2005.

Invitation to Pay Additional Fees (Partial International Search), Application No. PCT/US 03/31792, date of mailing Apr. 22, 2004.

Carley, L. Richard, "Trimming Analog Circuits Using Floating-Gate Analog MOS Memory", IEEE Journal of Solid-State Circuits, vol. 24, No. 6, Dec. 1989, pp. 1569-1575.

Raszka et al., "Embedded Flash Memory for Security Applications in a 0.13 µm CMOS Logic Process", Digest of Technical Papers, IEEE International Solid-State Circuits Conference 2004, p. 46.

* cited by examiner

RFID TAG UNCOUPLING ONE OF ITS ANTENNA PORTS AND METHODS

CROSS REFERENCE TO RELATED APPLICATIONS

This application is a continuation-in-part of U.S. patent application Ser. No. 10/812,493, filed Mar. 29, 2004 now abandoned in the name of inventors Ronald A. Oliver, Christopher J. Diorio and Todd E. Humes, entitled "CIRCUITS FOR RFID TAGS WITH MULTIPLE NON-INDEPENDENTLY DRIVEN RF PORTS", all commonly assigned herewith. This application is a continuation-in-part of U.S. patent application Ser. No. 10/815,474, filed Mar. 31, 2004 now abandoned in the name of inventors John D. Hyde, Omer Onen and Ronald A. Oliver, entitled "RFID TAGS COMBINING SIGNALS RECEIVED FROM MULTIPLE RF PORTS", all commonly assigned herewith.

FIELD OF THE INVENTION

The present invention is related to the field of Radio Frequency IDentification (RFID) tags, and more specifically to tags having an on-chip antenna and an off-chip antenna, and software and methods for their operation.

BACKGROUND OF THE INVENTION

Radio Frequency IDentification (RFID) tags can be used in many ways for locating and identifying objects to which they are attached. RFID tags are particularly useful in product-related and service-related industries for tracking large numbers of objects are being processed, inventoried, or handled. In such cases, an RFID tag is usually attached to individual items, or to their packages.

Issues of privacy have been raised in terms of using RFID tags for goods in the stream of commerce. Accordingly, to protect a purchaser's privacy, a "KILL" feature has been devised, where a tag is wholly disabled after the tagged goods have been purchased.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a radio section, a power management unit, a logical section, and a memory. Advances in semiconductor technology have miniaturized the electronics so much that an RFID tag can generate the backscatter while powered by only the RF signal it receives, enabling some RFID tags to operate without a battery.

The antenna system is typically provided on an inlay, and the electronics are provided in a chip that is attached to the inlay. Independently, in an effort of miniaturization, some efforts have been made to place the antenna on the chip, to forego the need of the inlay.

SUMMARY OF THE INVENTION

The invention improves over the prior art.

Briefly, the present invention provides RFID tags with an on-chip antenna and an off-chip antenna, and methods for operation. In one embodiment, one of the antennas can become uncoupled if the proper signal is received, while the other antenna may still operate. The uncoupled antenna can be the larger one, for example the off-chip antenna. Then the tag can then be read only by the smaller antenna, which effectively reduces the range of the RFID tag, but without disabling it entirely.

The invention offers advantages. In the above embodiment, the range is reduced and therefore a reader cannot read the tag from a distance. It could read the tag if it were located closer to it, but that is harder to do surreptitiously, so privacy is better protected. While in the stream of commerce, the invention may be useful for tagged items that have been moved from a large warehouse to a transportation vehicle, such as a train or a truck. This way they can still be read from short distances while being transported, but not from an unauthorized user at a distance.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

Figure 1:
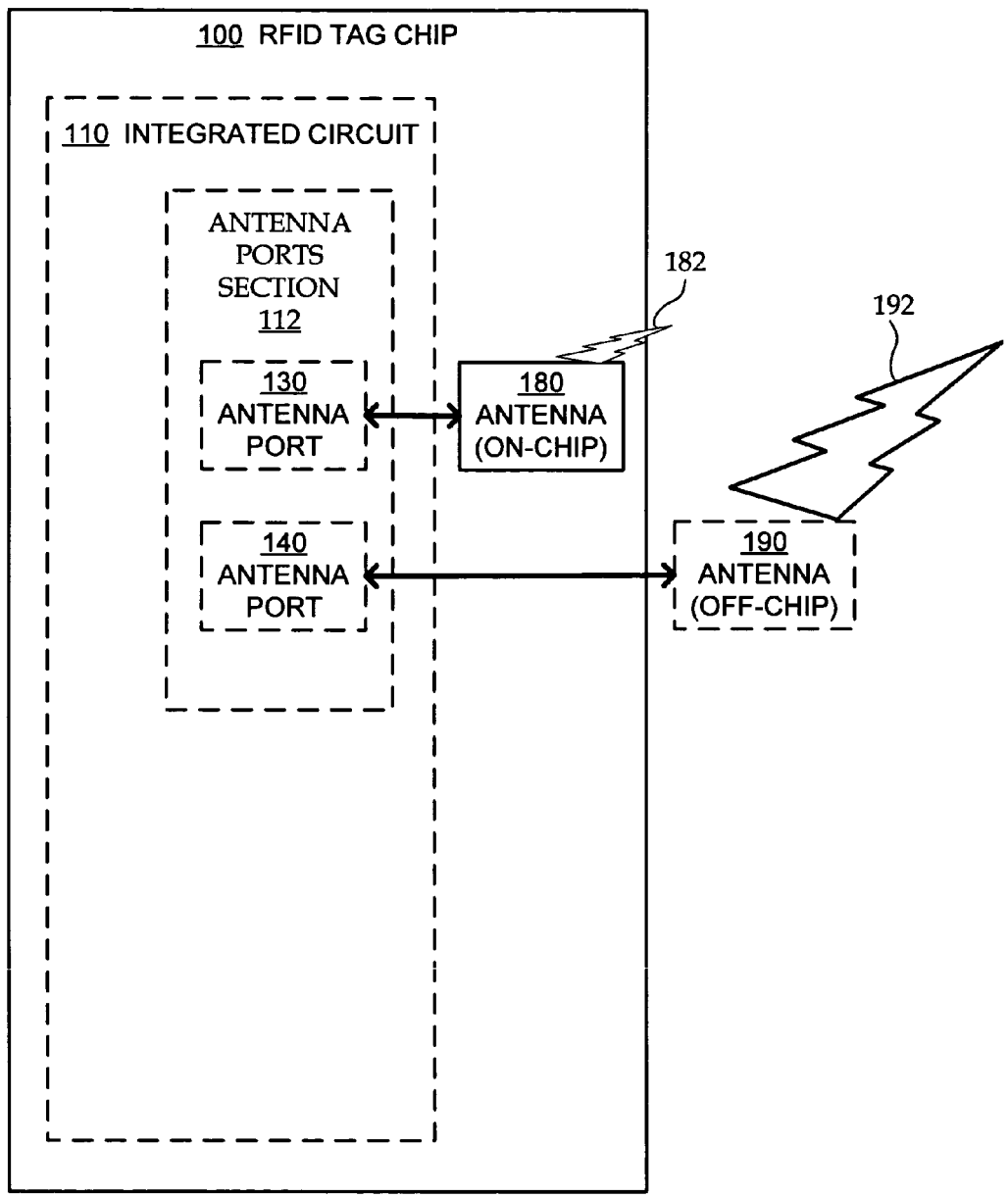
FIG. 1 is a block diagram showing relationships of components of an RFID tag chip according to embodiments of the invention.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

As has been mentioned, the present invention provides RFID tags with an on-chip antenna and an off-chip antenna, and methods for operation. In one embodiment, one of the antennas can become uncoupled if the proper signal is received. The invention is now described in more detail.

FIG. 1 is a diagram of components of an RFID tag chip 100 made according to an embodiment of the invention. Tag chip 100 includes an Integrated Circuit (IC) 110. In one embodiment, chip 100 includes a semiconductor material such as silicon, and IC 110 is formed in the semiconductor material.

Tag chip 100 includes an on-chip antenna 180, which can receive and transmit a wireless signal 182. Antenna 180 can be a single antenna or a combination of antennas. In some embodiments, antenna 180 is formed integrally with chip 100. In the embodiments where chip 100 includes a semiconductor material, antenna 180 is formed on or in the semiconductor material, or even above it. For example, the antenna may be formed using metal interconnects formed above the substrate.

A second antenna 190 can receive and transmit a wireless signal 192. Antenna 190 is also called an off-chip antenna because it is not formed integrally with chip 100. Antenna 190 can be a single antenna or a combination of antennas.

IC 110 includes antenna ports section 112, which includes at least two antenna ports 130, 140. In some embodiments, antenna ports 130, 140 are suitably selected locations within IC 110. In some embodiments, the locations are suitable for making electrical connections. More ports can be included, if additional antennas are implemented, both on-chip and off-chip.

On-chip antenna 180 is electrically coupled to port 130, which is also called on-chip port 130. Off-chip antenna 190 is electrically coupled to port 140, which is also called on-chip port 140. The connections are such that either one or both of antenna 180 and antenna 190 can operate together with the IC 110 as an RFID tag.

It will become apparent that, IC 110 controls antennas 180, 190, by suitably engaging ports 130, 140, respectively. That is why much of what is written about receiving a signal and transmitting a signal via an antenna is actually written in terms of its corresponding antenna port. In addition, function sets are described for ports, while in fact they refer to the associated antennas.

In the above described general embodiment of the invention, a function of ports 130, 140 is to channel to IC 110 a signal received from its respective antenna. Another function is to channel from IC 110 a signal to be transmitted wirelessly by its respective antenna. A possible function set of ports 130, 140 can be to not include one of these described functions according to the invention. In fact, some of these functions may be missing entirely, regardless of the operation of a later described switch. For example, on-chip antenna 180 might not be connected at all in a way that receives a wireless signal.

Figure 2A:
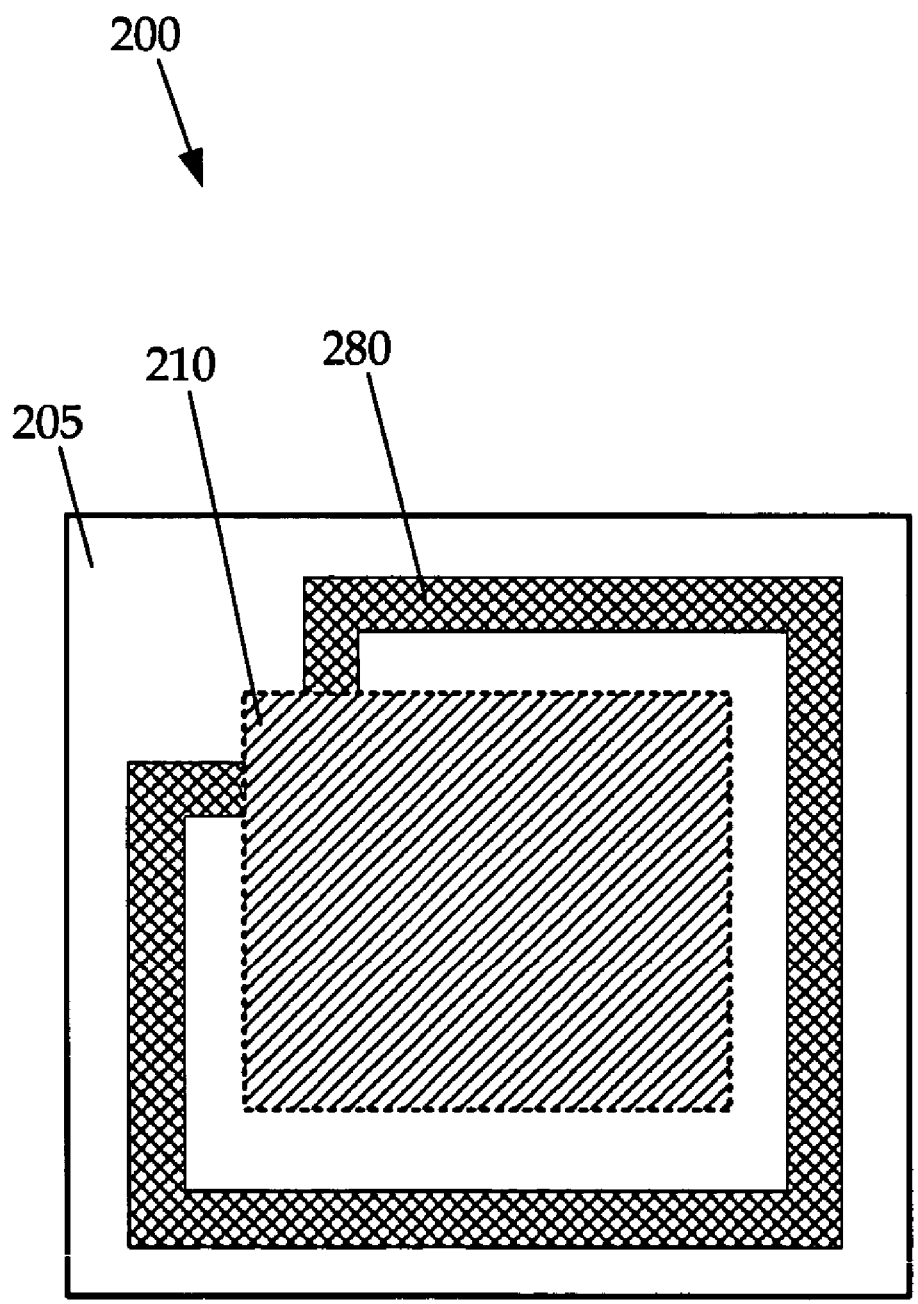
FIG. 2A is a view of an RFID tag chip that includes an on-chip antenna according to embodiments of the invention.

FIG. 2A is a view of an RFID tag chip 200, which could be made similarly to chip 100. Chip 200 includes a semiconductor substrate 205, in which an IC 210 is formed. Chip 200 also includes an on-chip antenna 280, which is formed integrally with substrate 205. Antenna 280 may be formed either in substrate 205, or on it, or both, or using metal interconnects formed above the substrate.

Figure 2B:
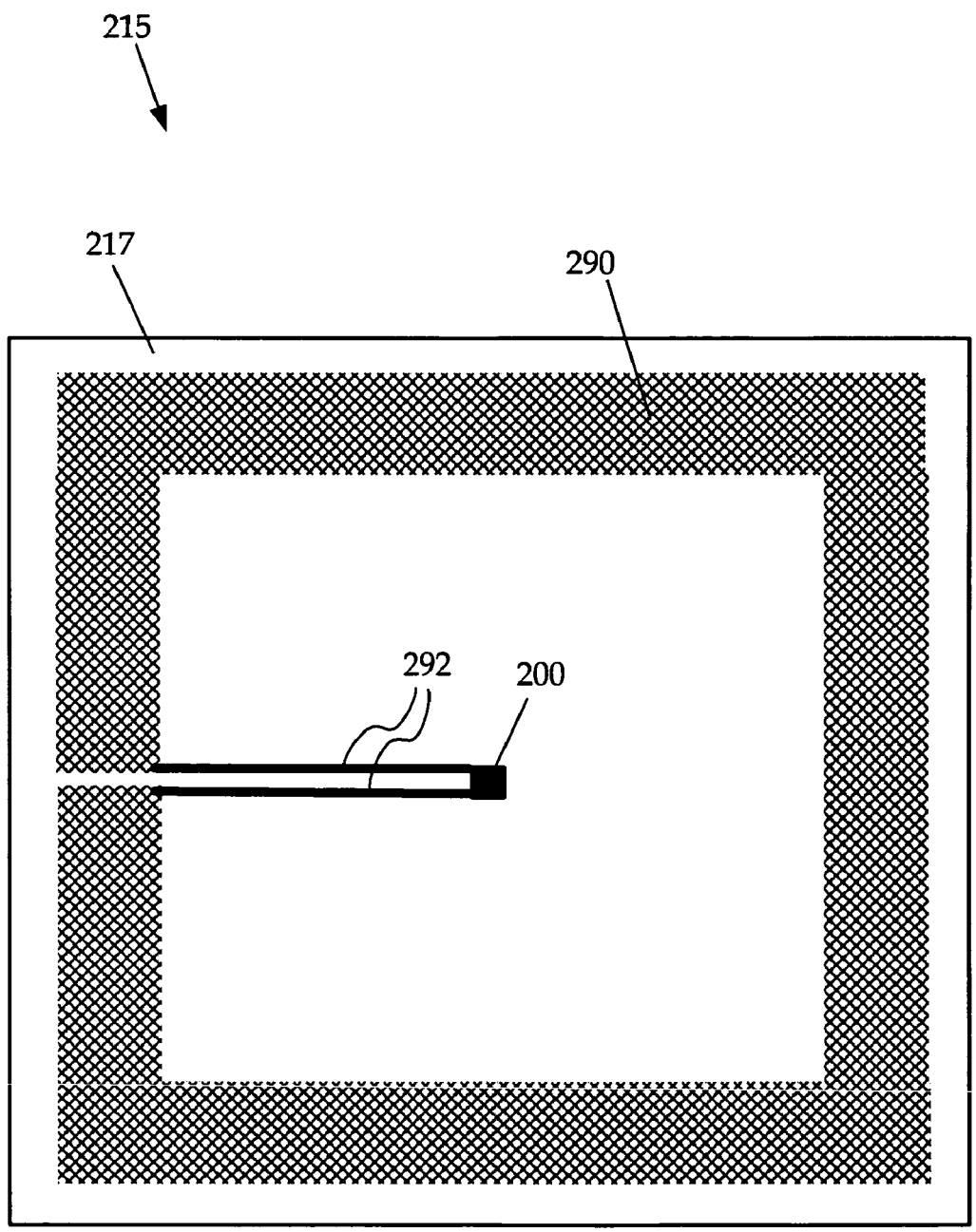
FIG. 2B is a view of an RFID tag that includes the chip of FIG. 2A.

FIG. 2B is a view of an RFID tag 215. Tag 215 includes an inlay 217, on which chip 200 is attached. In addition, inlay 217 includes a second antenna 290, which is coupled to chip 200 via conductors 292. Antenna 290 may be formed using any number of ways, such as printed conductive inks, etch metal lines, or other similar processes. In other embodiments, conductors 292 are shaped such that they are part of antenna 290. It is understood that, if chip 200 is made similarly to chip 100, antenna 290 is coupled to an off-chip port of IC 210 that is similar to off-chip port 140.

Tag 215 is assembled by placing chip 200 on inlay 217, and ensuring that conductors 292 are coupled appropriately with the off-chip port. So, ultimately, antenna 290 also becomes attached with chip 200, but that is not the same as being formed integrally with it.

A contrast of FIG. 2A and FIG. 2B will reveal differences between on-chip antenna 280 and off-chip antenna 290. On-chip antenna 280 is preferably manufactured at the same time as chip 200. It has a small size, similar to that of chip 200 that could be, for example, about 1 mm on the side. Accordingly, a wireless signal from on-chip antenna 280 has a short range.

On the other hand, off-chip antenna 290 has dimensions similar to those of inlay 217, which could be of the order of 1-2 inches on the side. Accordingly, a wireless signal from antenna 290 has a range much larger than that of antenna 280.

Figure 3:
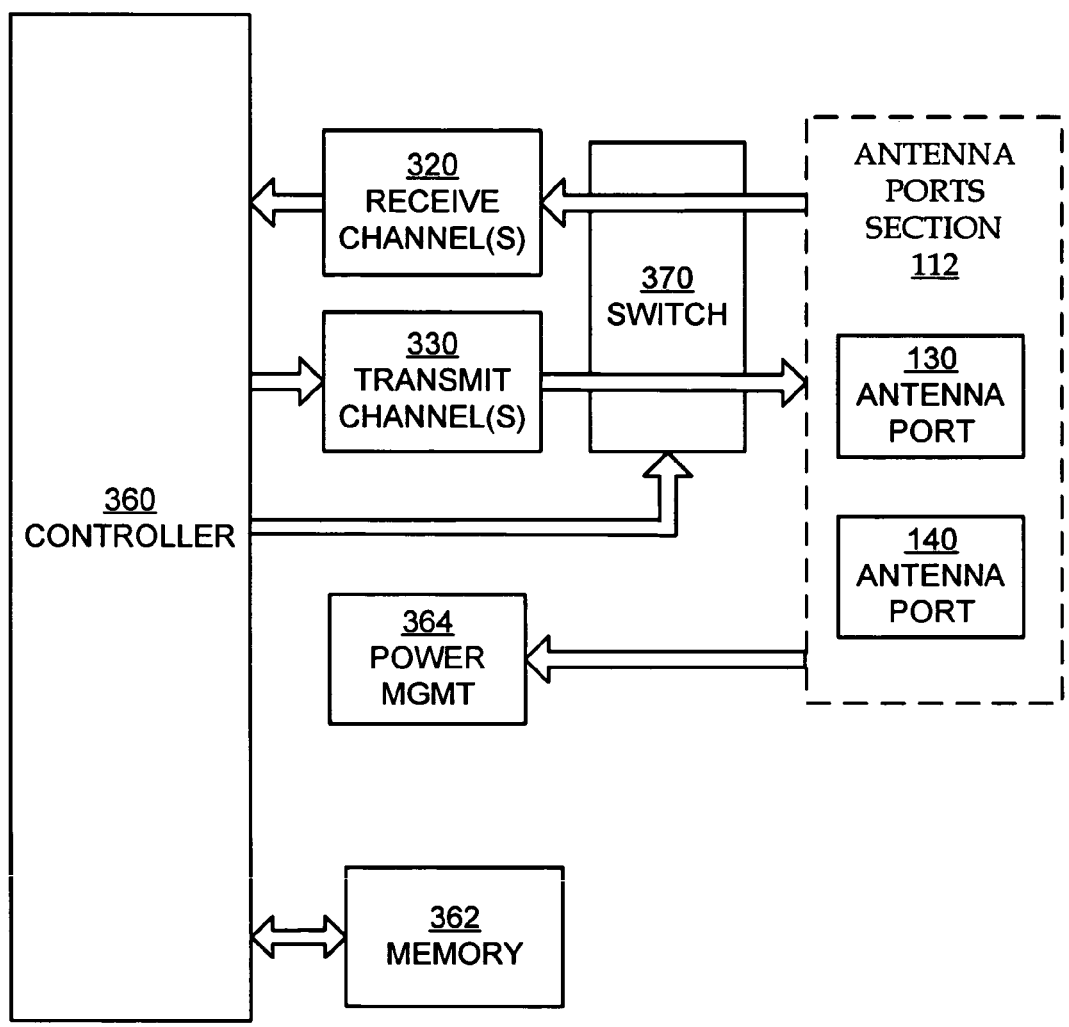
FIG. 3 is a block diagram illustrating a general circuit for implementing the IC of FIG. 1 according to embodiments of the invention.

FIG. 3 is a block diagram illustrating a general circuit 310 for implementing IC 110. Circuit 310 is capable of many particular embodiments according to the invention, some of which are described below.

Circuit 310 includes antenna ports section 112 as described above. Section 112 includes at least antenna port 130 and antenna port 140. If the invention is implemented with additional antennas, section 112 may include additional ports as necessary.

In addition, circuit 310 includes at least one controller 360, which may be implemented in any way known in the art. Controller 360 is coupled to antenna ports section 112 as described below.

Circuit 310 includes one or more receive channel(s) 320. Receive channel(s) 320 is adapted to channel to controller 360 signals received via port 130 or port 140 or both, depending on the exact configuration.

Circuit 310 also includes one or more transmit channel(s) 330. Transmit channel(s) 330 is adapted to channel from controller 360 signals to be transmitted wirelessly to port 130 or port 140 or both, depending on the exact configuration.

Circuit 310 further includes a Power Management Unit (PMU) 364. PMU 364 generates a voltage from wireless signals that are received in the antennas, and are transmitted via the ports as wired signals. In most embodiments, PMU 364 will receive most of its power from off-chip port 140, which is connected to the much larger off-chip antenna.

Circuit 310 additionally includes a switch 370, which may be implemented in many ways according to the invention. In a number of embodiments, switch 370 is adapted to disconnect controller 360 from port 130, port 140, or both ports 130 and 140. In some embodiments, the disconnect takes place along one or both of receive channel(s) 320 and transmit channel(s) 330. In other words, switch 370 may be adapted to disconnect channeling the received signals, or disconnect channeling the signals that are to be transmitted, or both.

Switch 370 may be operated as a result of a command signal, which may have been received wirelessly via one of the antennas. In most embodiments, the command signal is first interpreted by controller 360, which in turn operates switch 370.

In further embodiments, switch 370 may be operated to reconnect controller 360 with the disconnected port. This may take place responsive to additional command signals, or as per a protocol, and so on.

In some embodiments, PMU 364 is further adapted to generate the voltage from a signal received from port 130 and/or port 140, after that port has been disconnected from controller 360 by switch 370. This can be effectuated by having PMU 364 tap the received signal between switch 370 and antenna port(s) section 112. This feature is particularly desirable if off-chip port 140 is the disconnected one, where it provides the majority of the power.

Circuit 310 moreover includes a memory 362, for storing various data for use by controller 360. In some embodiments, memory 362 also stores at least one additional parameter for controlling switch 370, responsive to the command signal. For example, the additional parameter can be a delay time for operating switch 370 after receiving the command signal.

A number of particular arrangements according to the invention are described below, for some of the components of circuit 310. It will be apparent that these are shown by way of example, and not of limitation. In addition, other arrangements may be implemented by combining the teaching of the particular ones of the shown arrangements. Further, what is shown for one antenna port may also be applied equivalently to another.

Figure 4:
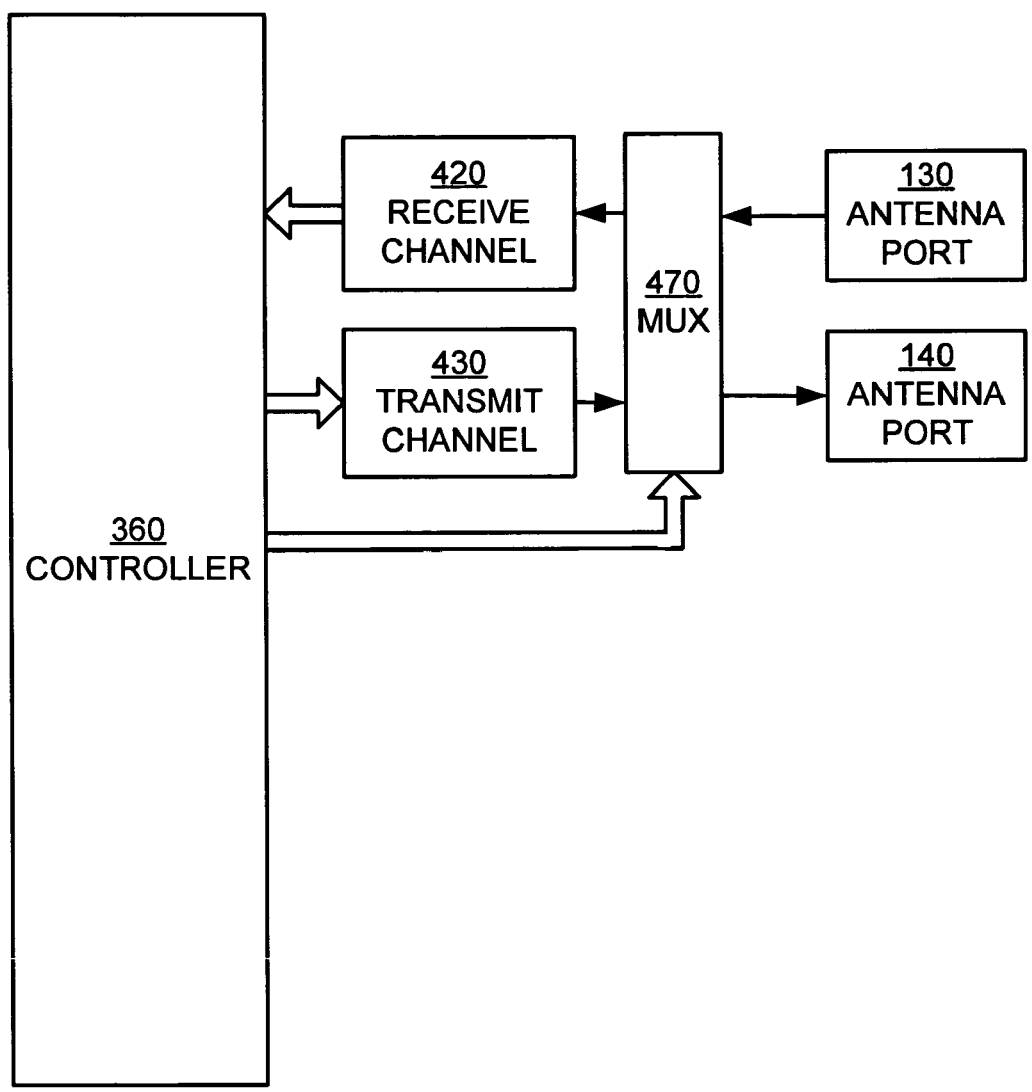
FIG. 4 is a diagram illustrating a particular arrangement of some of the components of the IC of FIG. 3 according to embodiments of the invention.

FIG. 4 is a diagram illustrating a particular arrangement 410 of some of the components of circuit 310. In arrangement 410, there is a single receive channel 420 and a single transmit channel 430 for both antenna ports 130, 140. A switch 470 is a multiplexer coupled to both receive channel 420 and transmit channel 430, and to both antenna ports 130, 140. Accordingly, switch 470 can couple either one or both antenna ports 130, 140 to either one or both receive channel 420 and transmit channel 430.

Figure 5A:
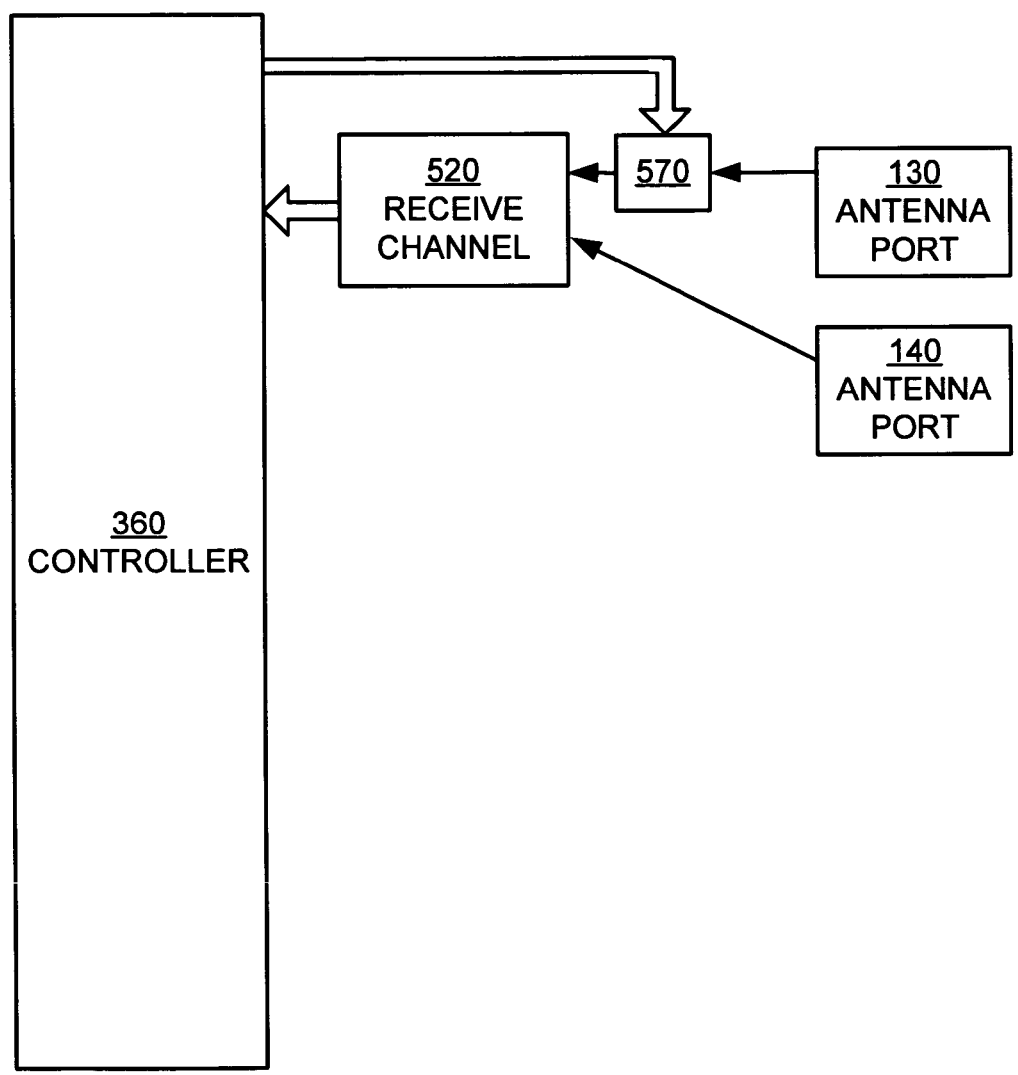
FIG. 5A is a diagram illustrating a particular arrangement of some of the components of the IC of FIG. 3, according to an embodiment of the invention where a receive channel is shared.

FIG. 5A is a diagram illustrating a particular arrangement 510 of some of the components of circuit 310. In arrangement 510, there is a single receive channel 520 for both antenna ports 130, 140. Any embodiment is possible for one or more transmit channels (not shown). A switch 570 is coupled so that it can disconnect receiving from antenna port 130, but not antenna port 140. This way, commands may be received from a long distance, and transmitted at an either long or short distance as selected.

Using a single receive channel 520 for both antenna ports 130, 140 can be accomplished any number of ways. One such way is described in co-pending U.S. patent application Ser. No. 10/815,474, filed Mar. 31, 2004 in the name of inventors John D. Hyde, Omer Onen and Ronald A. Oliver, entitled "RFID TAGS COMBINING SIGNALS RECEIVED FROM MULTIPLE RF PORTS".

Figure 5B:
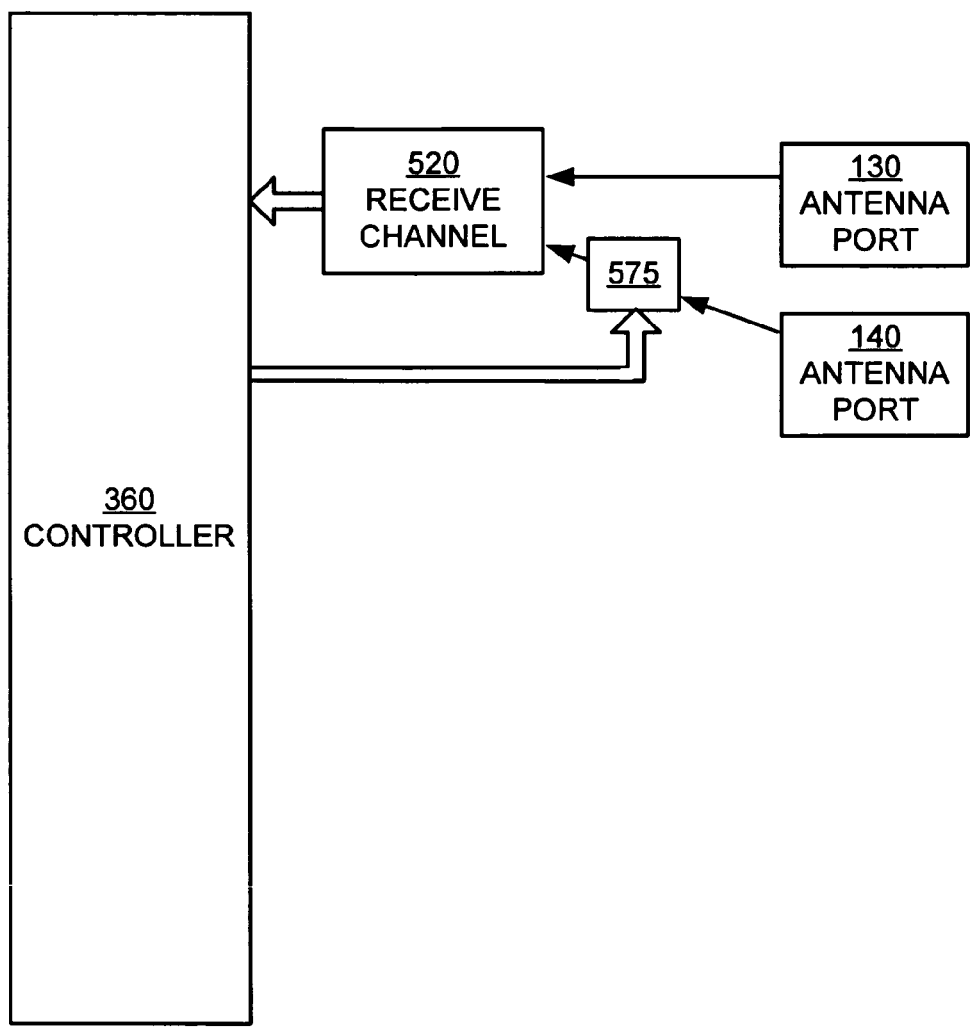
FIG. 5B is a diagram illustrating a particular arrangement of some of the components of the IC of FIG. 3, according to another embodiment of the invention where the receive channel is shared.

FIG. 5B is a diagram illustrating a particular arrangement 512 of some of the components of circuit 310. In arrangement 512, as in arrangement 510, there is a single receive channel 520 for both antenna ports 130, 140. Any embodiment is possible for one or more transmit channels (not shown). A switch 575 is coupled so that it can disconnect receiving from antenna port 140, but not from antenna port 130.

Figure 5C:
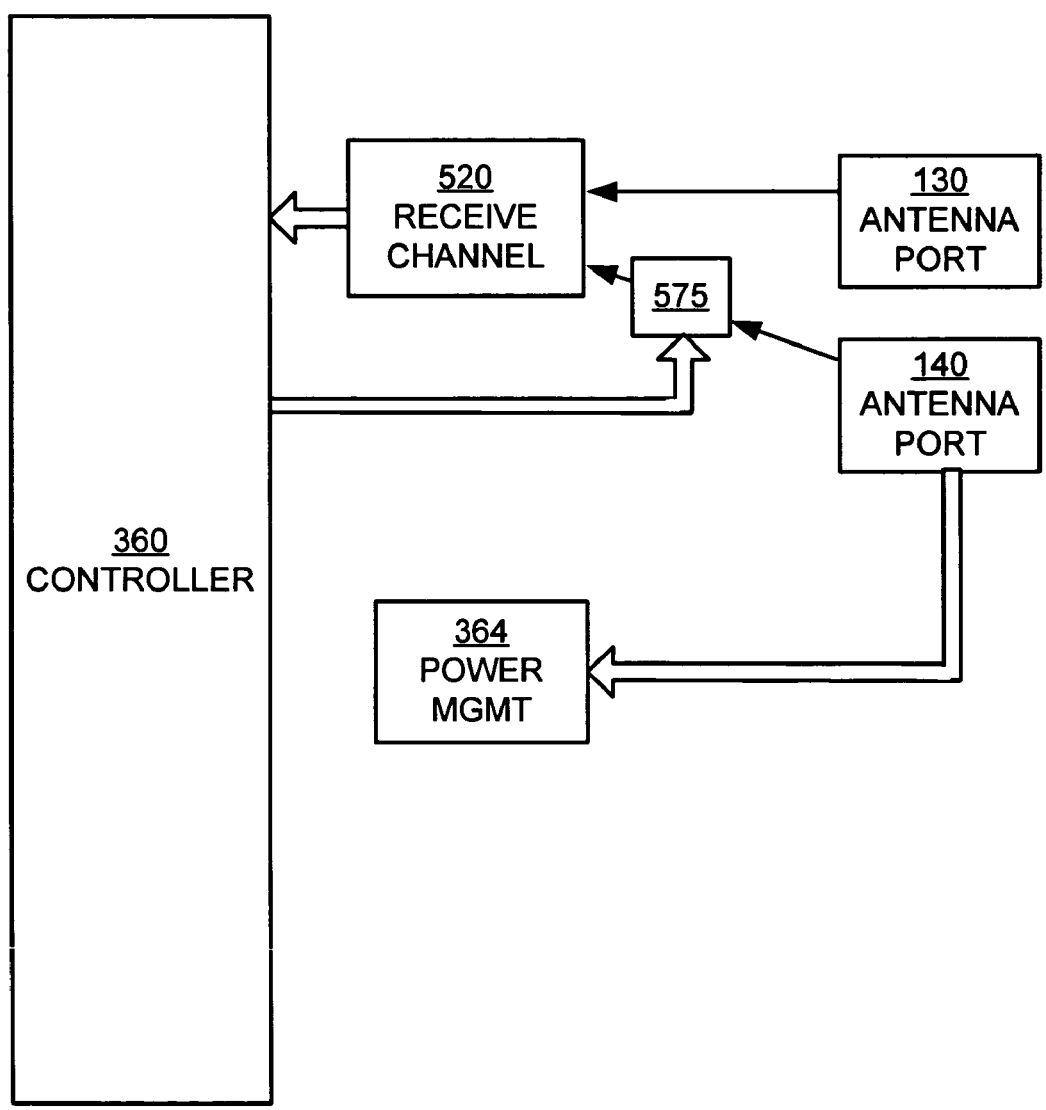
FIG. 5C is a diagram illustrating an embodiment of the invention similar to that of FIG. 5B, where further an antenna, disabled from receiving data and/or commands, nevertheless assists with power management.

FIG. 5C is a diagram illustrating a particular arrangement 514 of some of the components of circuit 310. Arrangement 514 is similar to arrangement 512, where the off-chip antenna is disabled from receiving by switch 575 disconnecting off-chip port 140 from controller 360. In addition, the off-chip antenna nevertheless assists with power management, by contributing a signal to PMU 364 via off-chip port 140.

Figure 6A:
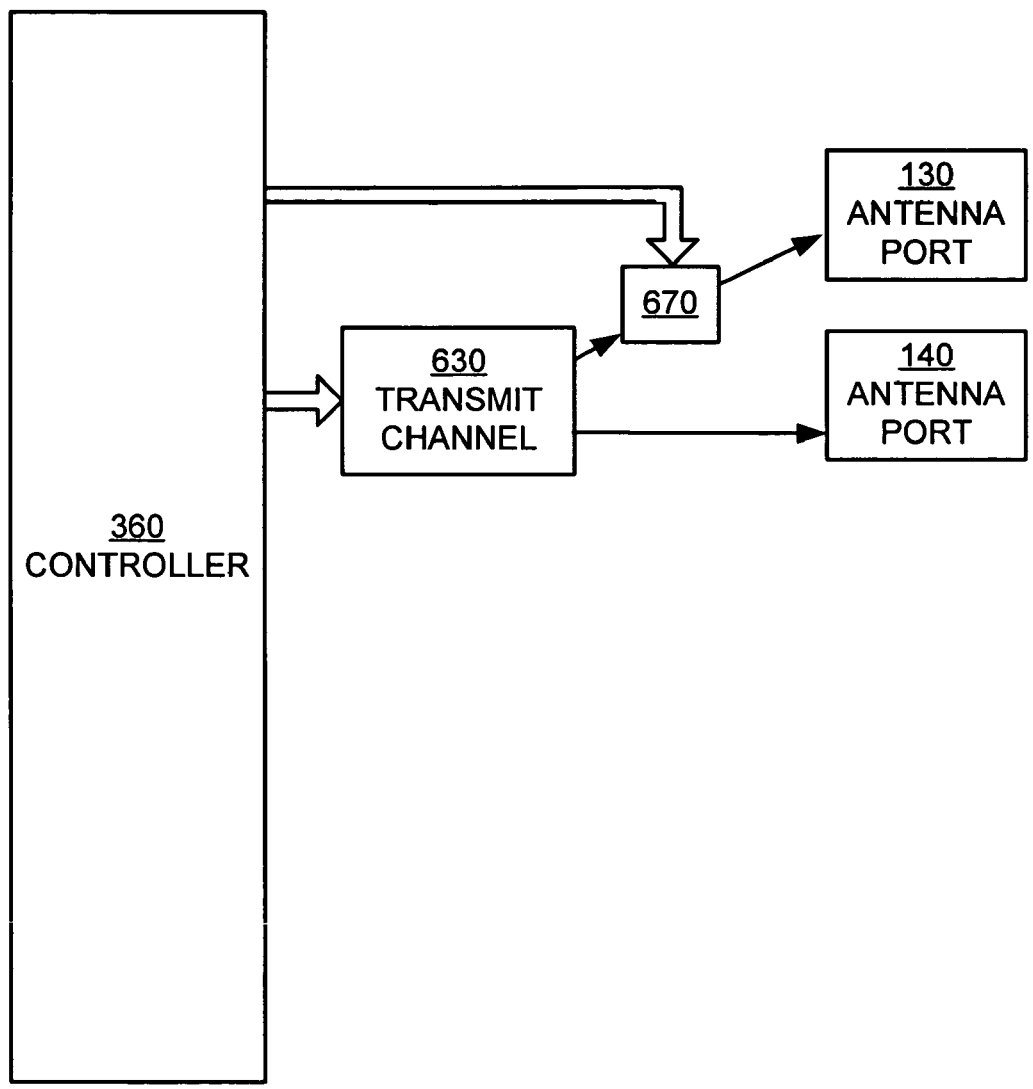
FIG. 6A is a diagram illustrating a particular arrangement of some of the components of the IC of FIG. 3, according to an embodiment of the invention where a transmit channel is shared.

FIG. 6A is a diagram illustrating a particular arrangement 610 of some of the components of circuit 310. In arrangement 610, there is a single transmit channel 630 for both antenna ports 130, 140. Any embodiment is possible for one or more receive channels (not shown). A switch 670 is coupled so that it can disconnect transmitting from antenna port 130, but not from antenna port 140.

Using a single transmit channel 630 for both antenna ports 130, 140 can be accomplished any number of ways. One such way is described in co-pending U.S. patent application Ser. No. 10/812,493, filed Mar. 29, 2004 in the name of inventors Ronald A. Oliver, Christopher J. Diorio and Todd E. Humes, entitled "CIRCUITS FOR RFID TAGS WITH MULTIPLE NON-INDEPENDENTLY DRIVEN RF PORTS".

Figure 6B:
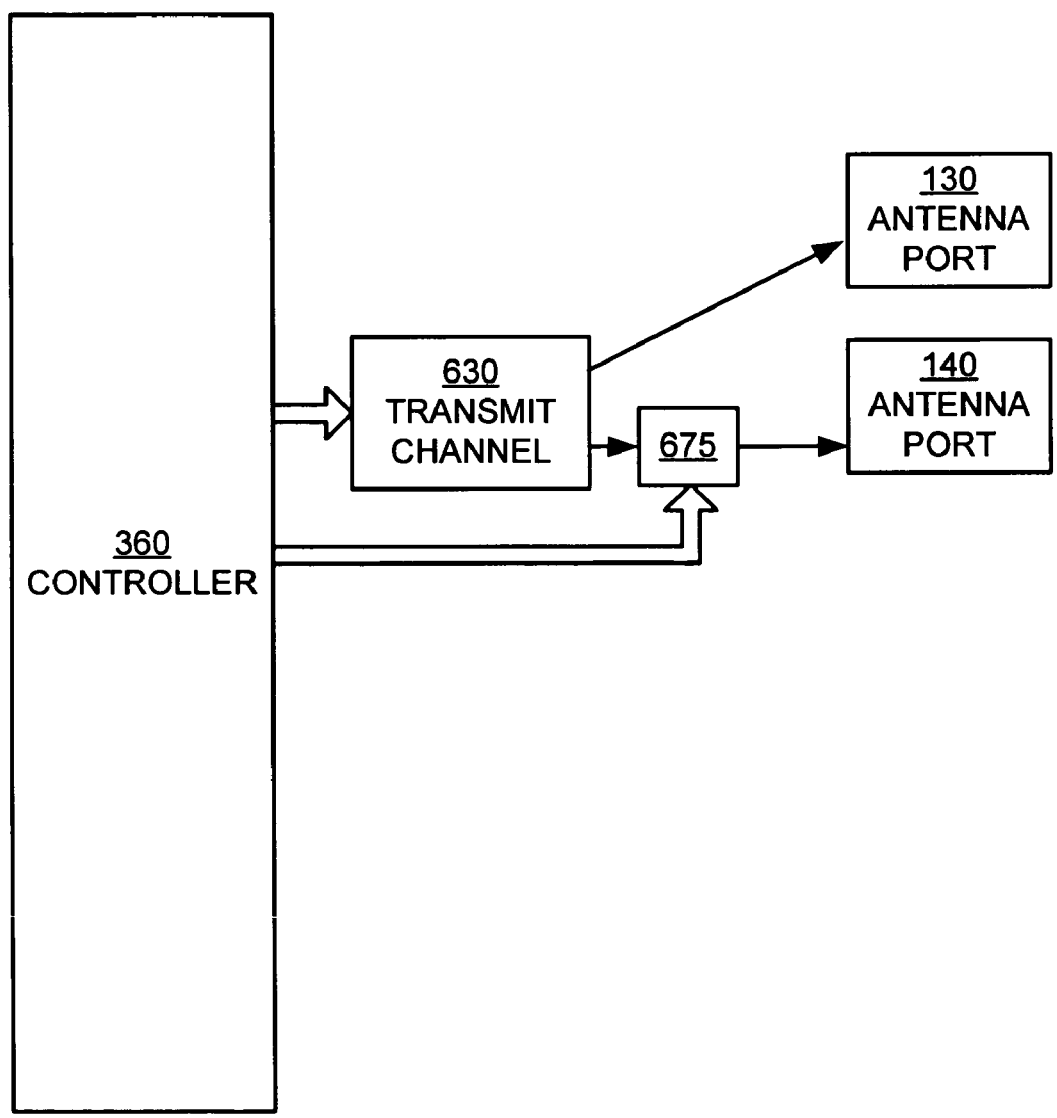
FIG. 6B is a diagram illustrating a particular arrangement of some of the components of the IC of FIG. 3, according to another embodiment of the invention where the transmit channel is shared.

FIG. 6B is a diagram illustrating a particular arrangement 612 of some of the components of circuit 310. In arrangement 612, as in arrangement 610, there is a single transmit channel 630 for both antenna ports 130, 140. Any embodiment is possible for one or more receive channels (not shown). A switch 675 is coupled so that it can disconnect transmitting from antenna port 140, but not from antenna port 140. This way, commands may be received from a long or short distance, but transmitted only at a short distance. This is helpful for privacy considerations.

Figure 6C:
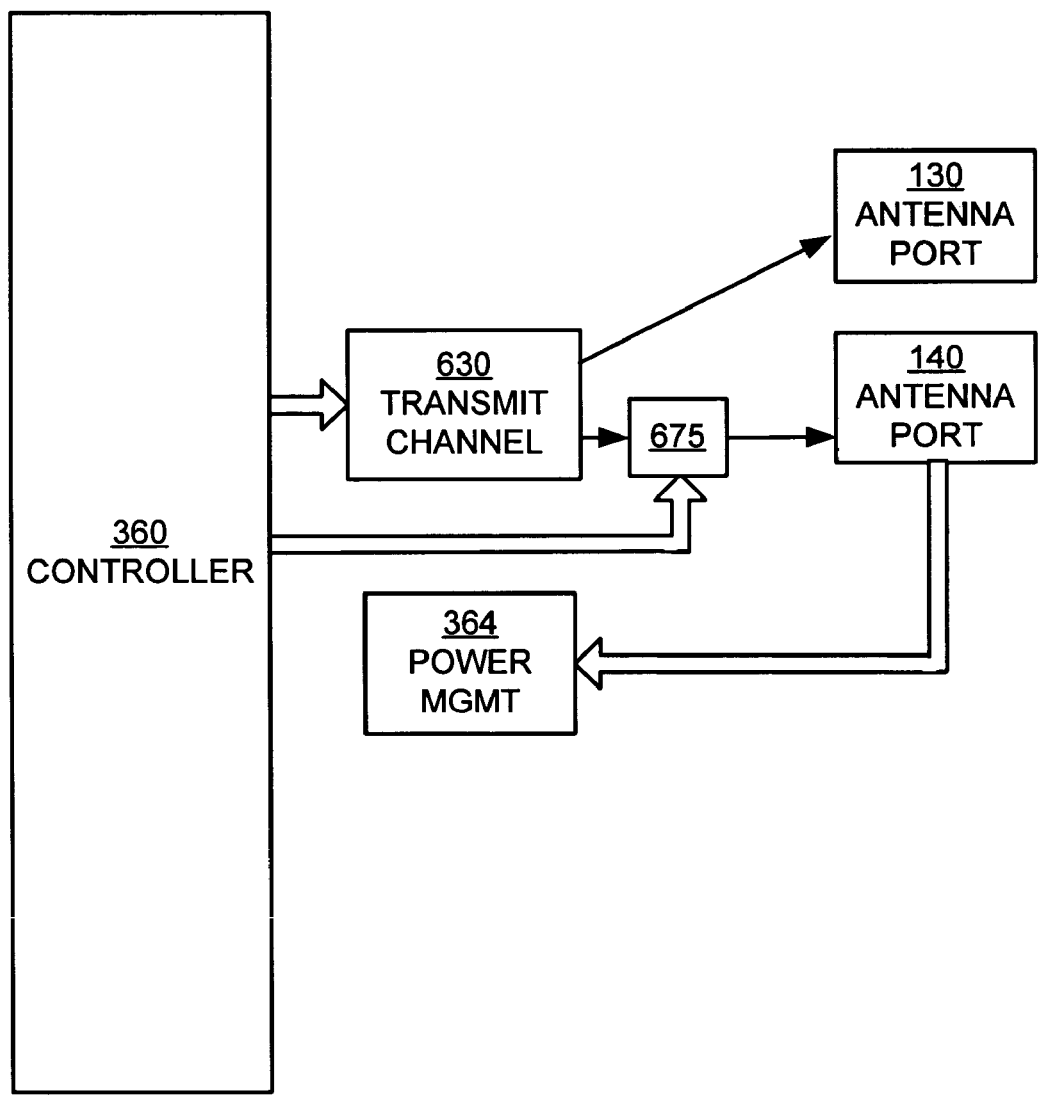
FIG. 6C is a diagram illustrating an embodiment of the invention similar to that of FIG. 6B, where further an antenna, disabled from transmitting data and/or commands, nevertheless assists with power management.

FIG. 6C is a diagram illustrating a particular arrangement 614 of some of the components of circuit 310. Arrangement 614 is similar to arrangement 612, where the off-chip antenna is disabled from transmitting by switch 675 disconnecting off-chip port 140 from controller 360. In addition, the off-chip antenna nevertheless assists with power management, by contributing a signal to PMU 364 via off-chip port 140.

Figure 7A:
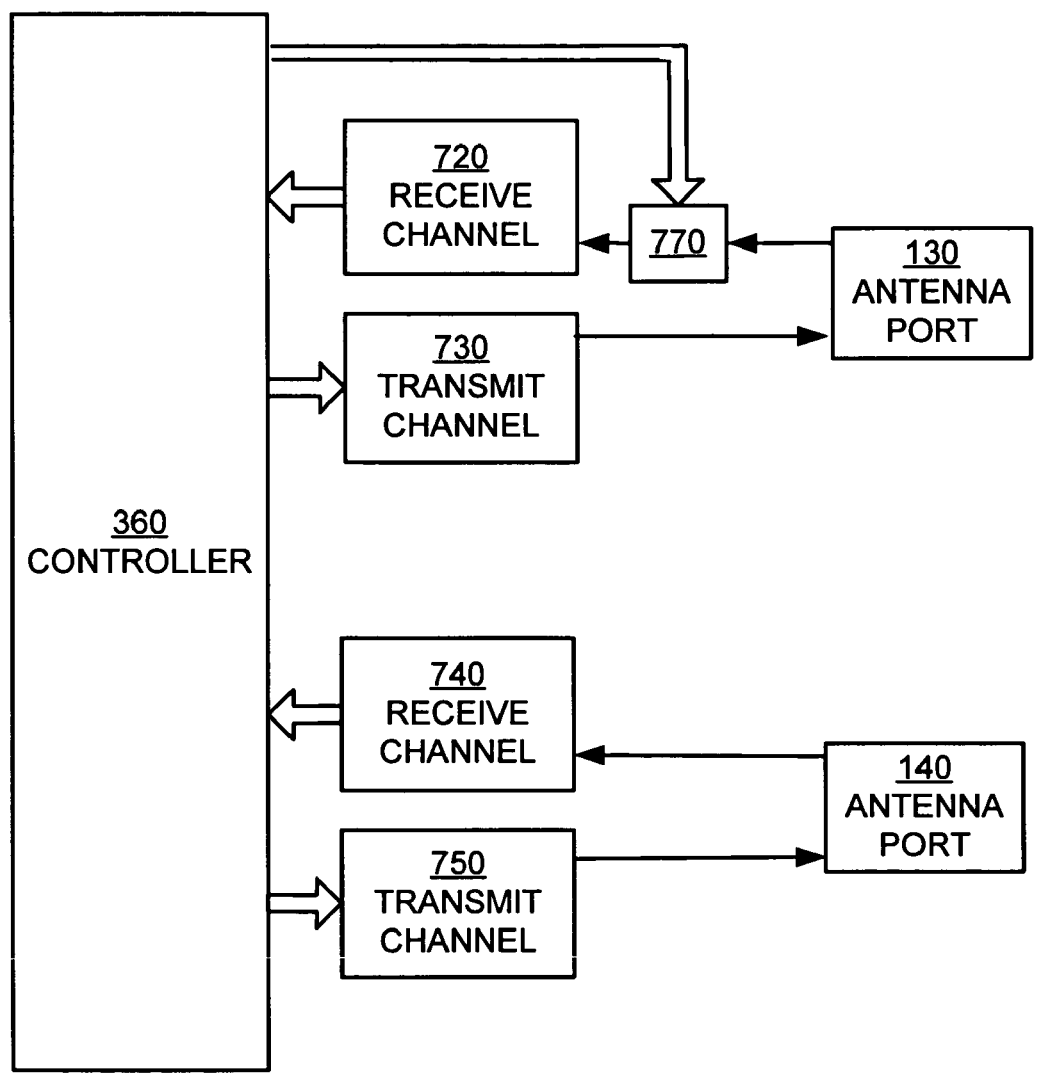
FIG. 7A is a diagram illustrating a particular arrangement of some of the components of the IC of FIG. 3, according to an embodiment of the invention where the antenna ports do not share channels.

FIG. 7A is a diagram illustrating a particular arrangement 710 of some of the components of circuit 310. In arrangement 710, for port 130 there is a receive channel 720 and a transmit channel 730. And for port 140 there is a receive channel 740 and a transmit channel 750. A switch 770 is coupled so that it can disconnect receiving from antenna port 130, but not transmitting from it. In addition, switch 770 does not affect antenna port 140.

It will be observed that antenna ports 130 and 140 do not share receive and transmit channels. This can be accomplished any number of ways. One such way is shown in FIG. 10 of U.S. patent application Ser. No. 10/072,984 titled "Radio Frequency Identification Architecture" by Shanks et al., published as document number 20020167405A1 on Nov. 14, 2002.

Figure 7B:
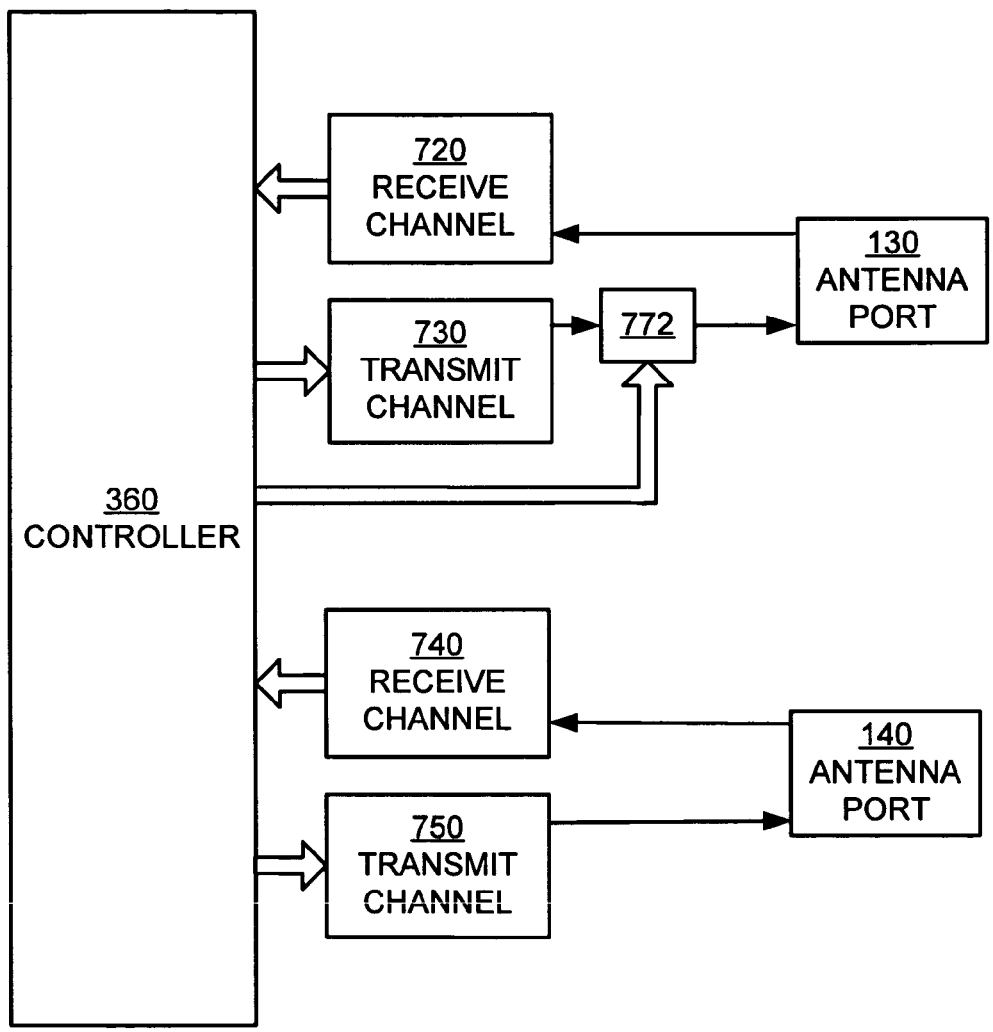
FIG. 7B is a diagram illustrating a particular arrangement of some of the components of the IC of FIG. 3, according to another embodiment of the invention where the antenna ports do not share channels.

FIG. 7B is a diagram illustrating a particular arrangement 712 of some of the components of circuit 310. Arrangement 712 is similar to arrangement 710, except there is no switch 770. Instead, a switch 772 is coupled so that it can disconnect transmitting from antenna port 130, but not receiving from it. In addition, switch 772 does not affect antenna port 140.

Figure 7C:
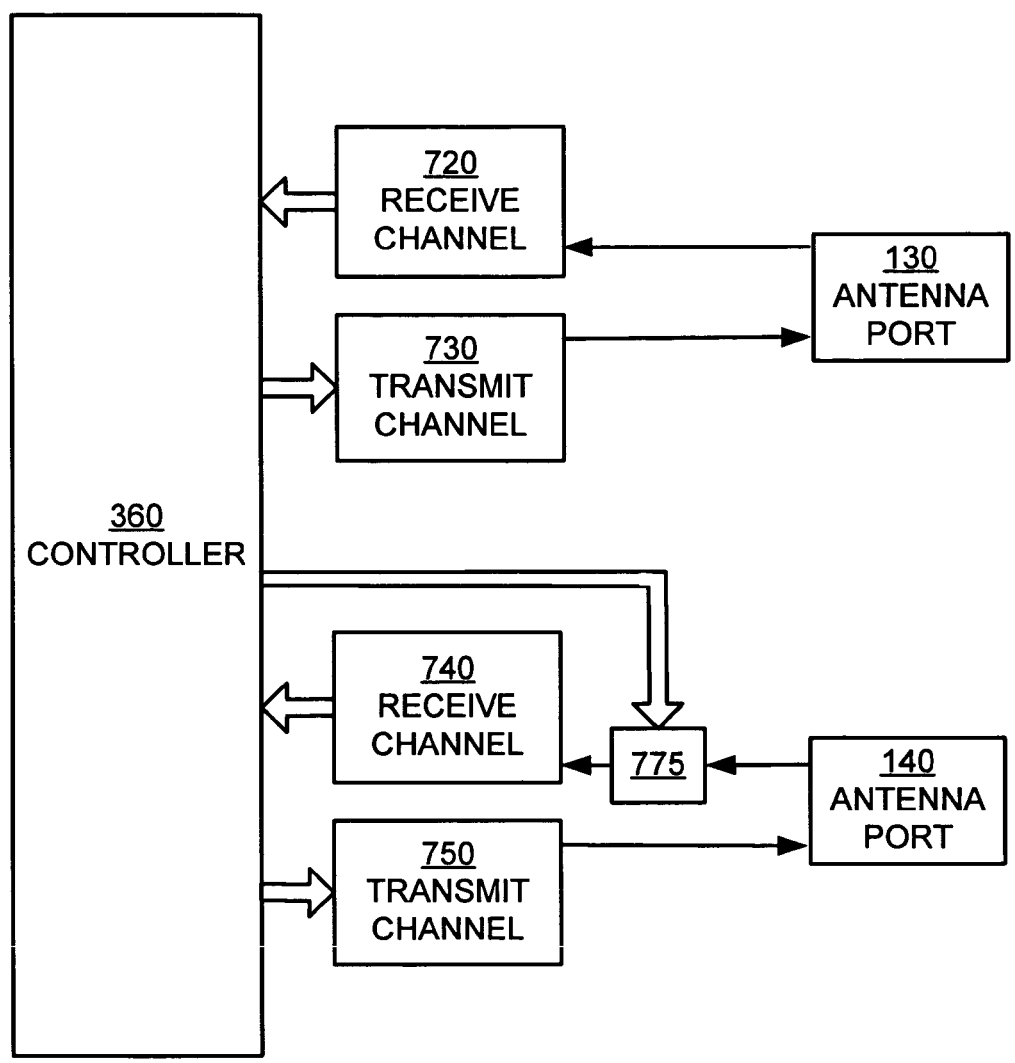
FIG. 7C is a diagram illustrating a particular arrangement of some of the components of the IC of FIG. 3, according to a further embodiment of the invention where the antenna ports do not share channels.

FIG. 7C is a diagram illustrating a particular arrangement 714 of some of the components of circuit 310. Arrangement 714 is similar to arrangement 710, except there is no switch 770. Instead, a switch 775 is coupled so that it can disconnect receiving from antenna port 140, but not transmitting from it. In addition, switch 775 does not affect antenna port 130.

Figure 7D:
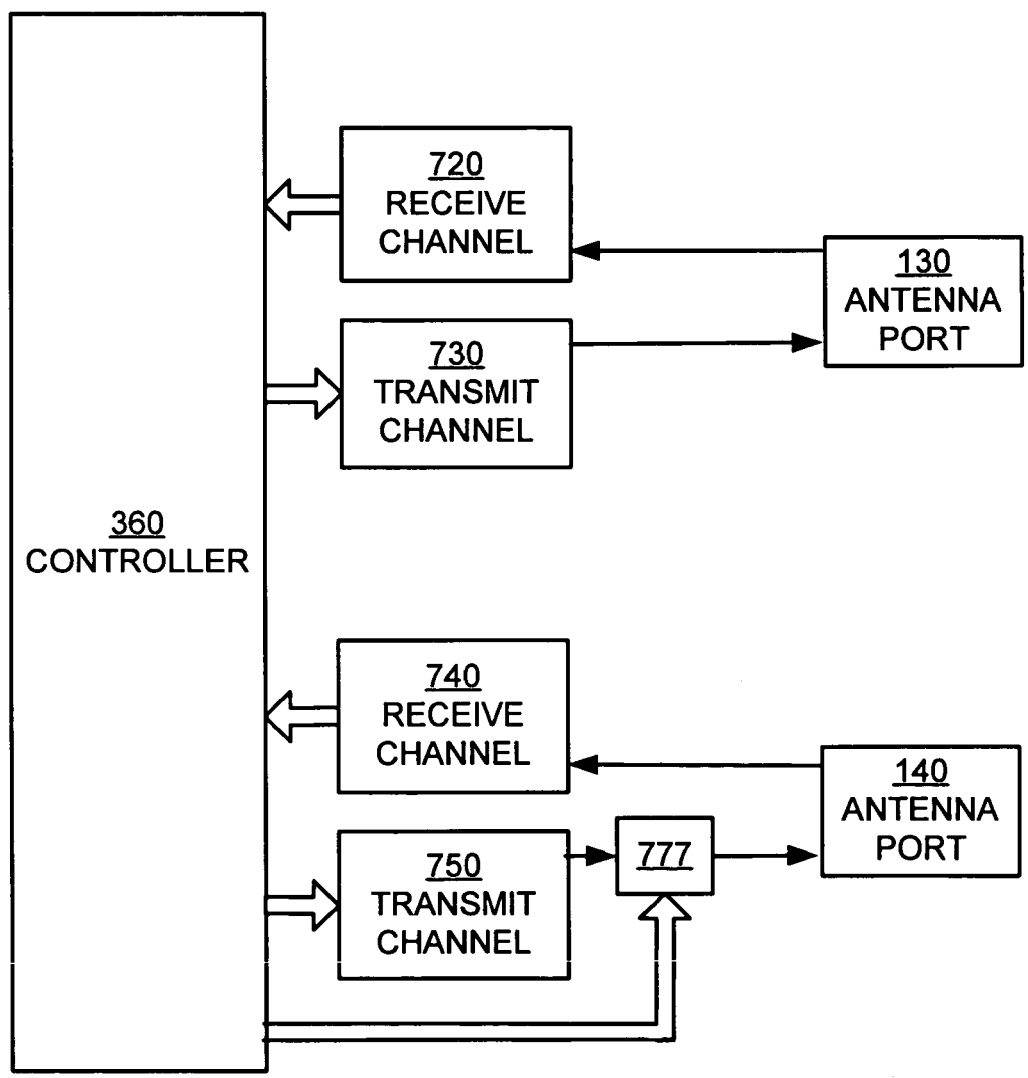
FIG. 7D is a diagram illustrating a particular arrangement of some of the components of the IC of FIG. 3, according to one more embodiment of the invention where the antenna ports do not share channels.

FIG. 7D is a diagram illustrating a particular arrangement 716 of some of the components of circuit 310. Arrangement 716 is similar to arrangement 710, except there is no switch 770. Instead, a switch 777 is coupled so that it can disconnect transmitting from antenna port 140, but not receiving from it. In addition, switch 775 does not affect antenna port 130.

For FIGS. 7A, 7B, 7C, 7D, it will be apparent that the same connection can be employed to receive power from the disconnected antenna. Indeed, the same connection can be implemented with PMU 364 as was shown in FIGS. 5A, 5B, 5C, 6A, 6B, and 6C.

The present invention may be further implemented by one or more devices that include logic circuitry, such as controller 360. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 8:
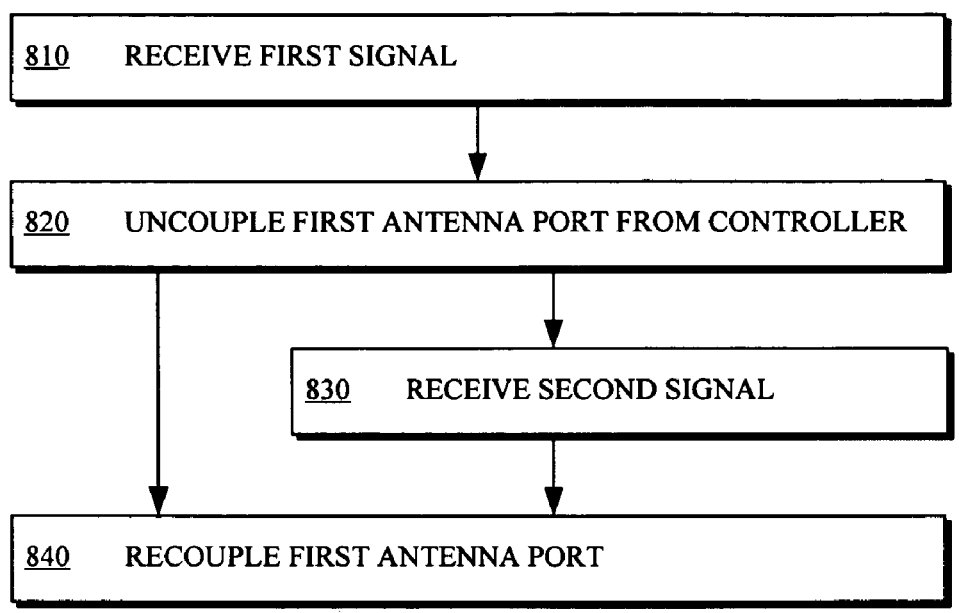
FIG. 8 is a flowchart illustrating a method according to an embodiment of the present invention.

FIG. 8 is flowchart 800 illustrating a method according to an embodiment of the invention. The method of flowchart 800 may be practiced by different embodiments of the invention, including but not limited to tags described earlier in this document.

At block 810, a first signal is received, which may be a command signal as described above. The first signal is received wirelessly in either one or both of an on-chip antenna and an off-chip antenna of an RFID tag. The tag includes a chip with an on-chip port and an off-chip port corresponding to the on-chip antenna and an off-chip antenna. The received first signal is passed through the one or more ports corresponding to the antennas, and then channeled to a controller of a chip of the tag.

At next block 820, one of the ports becomes uncoupled from the controller in response to receiving the first signal. By convention for FIG. 8 only, the uncoupled port is called the first one. In the preferred embodiment, the other one of the ports, which is also called the second one, does not become uncoupled in response to channeling the first signal.

It does not matter for the invention which one is considered to be the first port or the second port. In one embodiment, the first port is the on-chip port and the second port is the off-chip port. In another embodiment, the first port is the off-chip port and the second port is the on-chip port.

Further, uncoupling or disconnecting may be performed in any number of ways according to the invention. In principle, uncoupling is such that the first port becomes incapable of performing the same function set as prior to uncoupling. For example, uncoupling may be performed by setting a disable switch. The disable switch may interrupt a receive channel, such that uncoupling prevents channeling to the controller a wirelessly received signal via the first port. Alternately, the disable switch may interrupt a transmit channel, such that uncoupling prevents channeling from the controller to the first port a signal to be transmitted wirelessly.

In addition, uncoupling may be such that the second port remains coupled to the controller, and retains its full function set. In other words, uncoupling renders the function set of the first port different from that of the second set. In other embodiments, uncoupling may be such that power is generated from a subsequent signal received via the uncoupled port.

At optional next block 830, a second wireless signal is received, which is similar to the first signal except that it is optional. Indeed, the second signal may incorporate a command to reverse the effect of the first signal.

At next block 840, the uncoupled antenna port is recoupled to the controller, thus reversing the effect of block 820. Recoupling may take place either automatically as a result of uncoupling, or in response to the second signal, if such is received according to optional block 830. For example, recoupling may take place a preset amount of time after uncoupling. The preset amount of time may be stored in a memory, or decoded from the first or second signal.

Figure 9A:
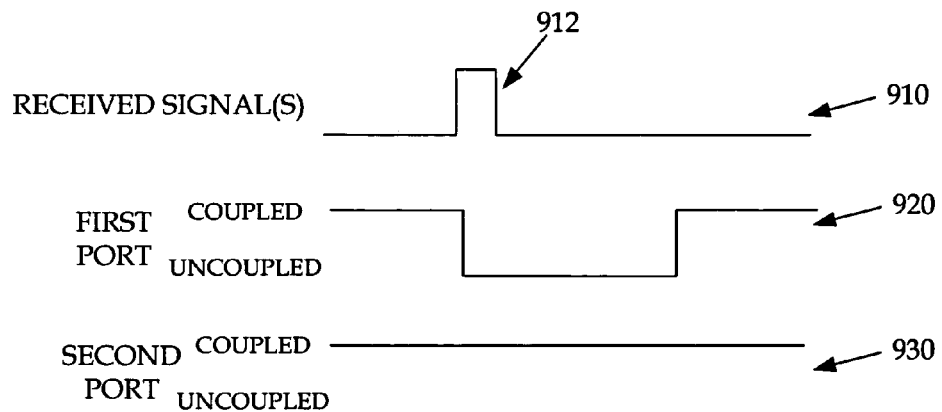
FIG. 9A is a timing diagram illustrating how an antenna port of an RFID tag may be uncoupled and then recoupled in response to a command signal according to an embodiment of the invention.

FIG. 9A is a timing diagram illustrating how an antenna port of an RFID tag may be uncoupled and then recoupled in response to a command signal according to an embodiment of the invention. A waveform 910 shows a command signal 912. A waveform 920 shows how a coupled first port becomes uncoupled responsive to signal 912, and then again coupled after some time without needing an additional command signal. A waveform 930 shows how a second port remains coupled all this time. This embodiment corresponds to where optional block 830 is not performed.

Figure 9B:
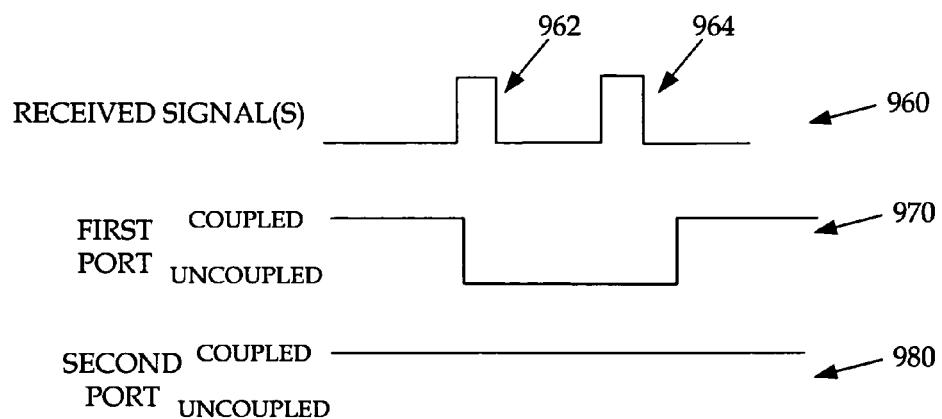
FIG. 9B is a timing diagram illustrating how an antenna port of an RFID tag may be uncoupled in response to a command signal, and then recoupled in response to another command signal according to an embodiment of the invention.

FIG. 9B is a timing diagram illustrating how an antenna port of an RFID tag may be uncoupled in response to a command signal, and then recoupled in response to another command signal according to an embodiment of the invention. A waveform 960 shows two command signals 962, 964. A waveform 970 shows how a coupled first port becomes uncoupled responsive to signal 912. The first port then becomes coupled again responsive to signal 964, and after some time passes. A waveform 980 shows how a second port remains coupled all this time. This embodiment corresponds to where optional block 830 is performed.

Figure 10A:
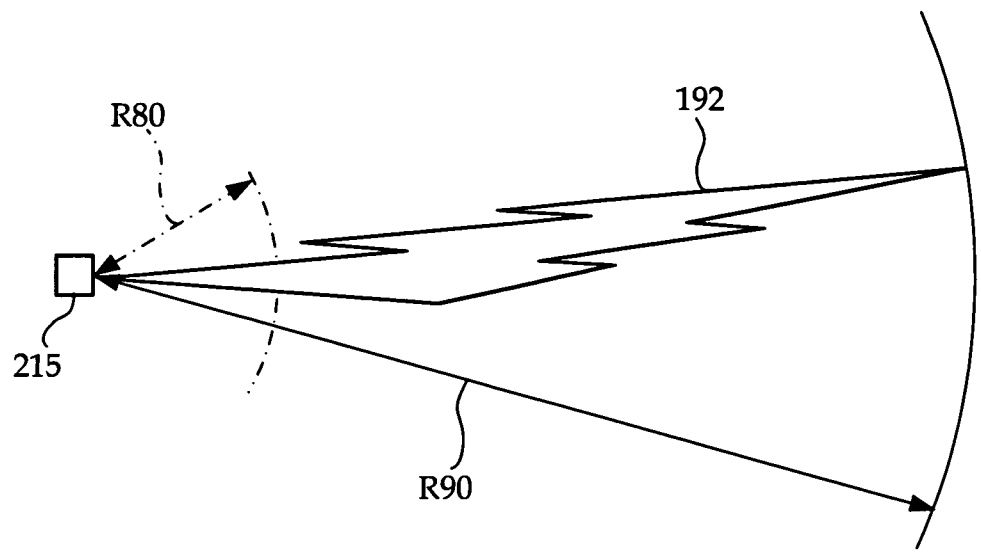
FIG. 10A is a diagram illustrating a normal range of an RFID tag according to the invention, while an off-chip antenna is coupled.
Figure 10B:
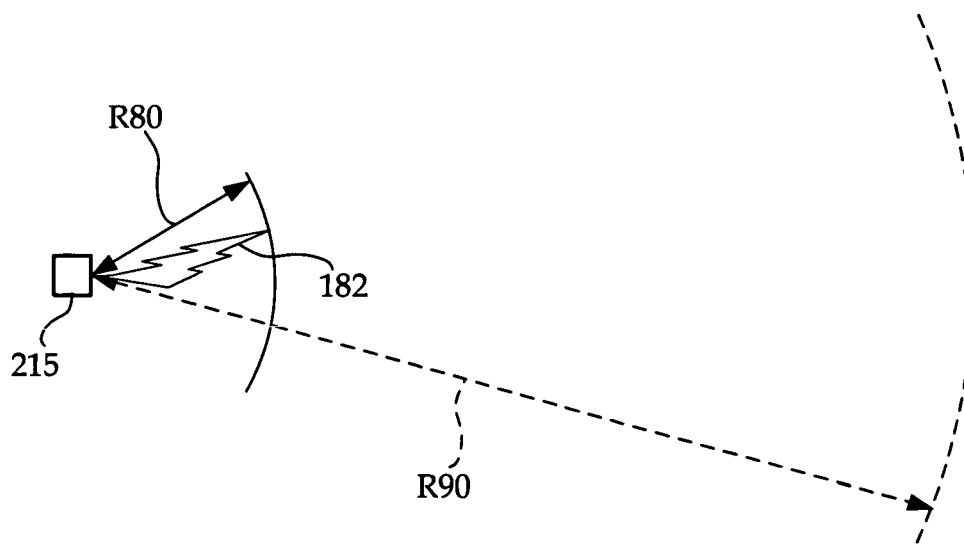
FIG. 10B is a diagram illustrating a range of an RFID tag according to the invention, while the off-chip antenna is uncoupled.

FIG. 10A and FIG. 10B are intended to illustrate the advantage of the invention. FIG. 10A is a diagram illustrating a normal range R90 of tag 215, where the large off-chip antenna is coupled, and signal 192 can be transmitted and/or received. In that sense, tag 215 can be indistinguishable in operation from a regular tag, as range R90 can be the same as customary tag ranges. In addition, range R80 is enabled by the small on-chip tag, but that is dwarfed by range R90 of signal 192.

In FIG. 10B, the off-chip port of the off-chip antenna has been uncoupled from the processor. Accordingly, the off-chip antenna either does not receive, or does not transmit, or both depending on the embodiment. The effective range of tag 215 becomes R80 of the on-chip antenna, for signal 182. Range R80 is much smaller than range R90, which helps in security applications.

Other options are also possible, such as to enable powering and commanding IC 215 at the long range of R90, while backscatter transmitting at the shorter range of R80, for better privacy and security.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a semiconductor substrate having formed therein an integrated circuit (IC) that includes a first antenna port and a second antenna port; and
   a first antenna formed integrally with the semiconductor substrate and electrically coupled to the first port,
   wherein at least one of the first antenna and a second antenna that is coupled to the second port and is not formed integrally with the semiconductor substrate is capable of operating together with the IC as an RFID tag.

2. The device of claim 1, further comprising:
   an inlay that includes the second antenna, and
   wherein the second port is coupled to the second antenna.

3. The device of claim 2, wherein
   the inlay includes a third antenna,
   the semiconductor substrate includes a third port coupled to the third antenna and to the IC.

4. The device of claim 1, wherein the IC includes
   a controller coupled to the first port and to the second port, and
   a switch adapted to disconnect one of the first port and the second port from the controller.

5. The device of claim 4, wherein
   the disconnected port is incapable of performing the same function set as prior to being disconnected.

6. The device of claim 4, wherein
   the switch is adapted to not disconnect the controller from the other one of the first port and the second port.

7. The device of claim 4, wherein the IC further includes
   a power management unit adapted to generate a power voltage from a signal received from the disconnected one of the first port and the second port.

8. The device of claim 4, wherein
   the switch is adapted to disconnect the controller from the first port.

9. The device of claim 4, wherein
   the switch is adapted to disconnect the controller from the second port.

10. The device of claim 4, wherein
    the IC further includes a receive channel adapted to channel to the controller signals received via the first port, and
    the switch is adapted to disconnect channeling the received signals.

11. The device of claim 4, wherein
    the IC further includes a receive channel adapted to channel to the controller signals received via the second port, and
    the switch is adapted to disconnect channeling the received signals.

12. The device of claim 4, wherein
    the IC further includes a transmit channel and a receive channel both coupled to the controller, and
    the switch is a multiplexer coupled to both the transmit channel and the receive channel.

13. The device of claim 4, wherein
    the IC further includes a transmit channel adapted to channel from the controller to the first port signals to be transmitted wirelessly, and
    the switch is adapted to disconnect channeling the signals to be transmitted.

14. The device of claim 4, wherein
    the IC further includes a transmit channel adapted to channel from the controller to the second port signals to be transmitted wirelessly, and
    the switch is adapted to disconnect channeling the signals to be transmitted.

15. The device of claim 4, wherein
    the switch is controlled responsive to a command signal received via one of the first and second antennas.

16. The device of claim 15, wherein
    the IC further includes a memory accessible by the controller, and
    the memory stores an additional parameter for controlling the switch responsive to the command signal.

17. The device of claim 4, wherein
    the switch is further adapted to reconnect the disconnected port to the controller so as to reverse the disconnecting.

18. The device of claim 17, wherein
    the switch is controlled responsive to a command signal received via one of the first and second antennas.

19. The device of claim 18, wherein
    the IC further includes a memory accessible by the controller, and
    the memory stores an additional parameter for controlling the switch responsive to the command signal.

20. An article comprising:
    a storage medium, the storage medium having instructions stored thereon, in which when the instructions are executed by at least one device, they result in:
    channeling to a controller of a chip of an RFID tag a first signal that is received from at least one of a first antenna port and a second antenna port; and
    uncoupling the first port from the controller in response thereto.

21. The article of claim 20, in which
    uncoupling is such that the first port becomes incapable of performing the same function set as prior to uncoupling.

22. The article of claim 20, in which
    uncoupling is such that the first port becomes incapable of performing the same function set as the second port.

23. The article of claim 20, in which
    uncoupling is such that the second port remains coupled to the controller.

24. The article of claim 20, in which
    the first port is coupled to an antenna that is integrally formed with the chip, and
    the second port is coupled to an antenna that is not integrally formed with the chip.

25. The article of claim 20, in which
    the first port is coupled to an antenna that is not integrally formed with the chip, and
    the second port is coupled to an antenna that is integrally formed with the chip.

26. The article of claim 20, in which uncoupling prevents channeling to the controller a wirelessly received signal via the first port.

27. The article of claim 20, in which
    uncoupling prevents channeling from the controller to the first port a signal to be transmitted wirelessly.

28. The article of claim 20, in which executing the instructions further results in:
    generating power from a subsequent signal received via the uncoupled port.

29. The article of claim 20, in which
    uncoupling is performed by setting a disable switch.

30. The article of claim 20, in which executing the instructions further results in:

recoupling the uncoupled first port to the controller to reverse the uncoupling.

31. The article of claim 30, in which
recoupling is performed a preset amount of time after uncoupling.

32. The article of claim 31, in which
the preset amount of time is stored in a memory.

33. The article of claim 31, in which executing the instructions further results in:
decoding the preset amount of time from the first signal.

34. The article of claim 30, in which executing the instructions further results in:
receiving a second wireless signal, and
wherein recoupling is performed responsive to receiving the second signal.

35. The article of claim 34, in which
recoupling is performed a preset amount of time after being receiving the second signal.

36. The article of claim 35, in which
the preset amount of time is stored in a memory.

37. The article of claim 35, in which executing the instructions further results in:
decoding the preset amount of time from the second signal.

38. A method for a chip of an RFID tag comprising:
channeling to a controller of the chip a first signal that is received from at least one of a first antenna port and a second antenna port; and
uncoupling the first port from the controller in response thereto.

39. The method of 38, wherein
uncoupling is such that the first port becomes incapable of performing the same function set as prior to uncoupling.

40. The method of 38, wherein
uncoupling is such that the first port becomes incapable of performing the same function set as the second port.

41. The method of 38, wherein
uncoupling is such that the second port remains coupled to the controller.

42. The method of 38, wherein
the first port is coupled to an antenna that is integrally formed with the chip, and
the second port is coupled to an antenna that is not integrally formed with the chip.

43. The method of 38, wherein
the first port is coupled to an antenna that is not integrally formed with the chip, and
the second port is coupled to an antenna that is integrally formed with the chip.

44. The method of 38, wherein
uncoupling prevents channeling to the controller a wirelessly received signal via the first port.

45. The method of 38, wherein
uncoupling prevents channeling from the controller to the first port a signal to be transmitted wirelessly.

46. The method of 38, further comprising:
generating power from a subsequent signal received via the uncoupled port.

47. The method of 38, wherein
uncoupling is performed by setting a disable switch.

48. The method of 38, further comprising:
recoupling the uncoupled first port to the controller to reverse the uncoupling.

49. The method of 48, wherein
recoupling is performed a preset amount of time after uncoupling.

50. The method of 49, wherein
the preset amount of time is stored in a memory.

51. The method of 49, further comprising:
decoding the preset amount of time from the first signal.

52. The method of 48, further comprising:
receiving a second wireless signal, and
wherein recoupling is performed responsive to receiving the second signal.

53. The method of 52, wherein
recoupling is performed a preset amount of time after being receiving the second signal.

54. The method of 53, wherein
the preset amount of time is stored in a memory.

55. The method of 53, further comprising:
decoding the preset amount of time from the second signal.

* * * * *

UNITED STATES PATENT AND TRADEMARK OFFICE
CERTIFICATE OF CORRECTION

| | | |
|---|---|---|
| PATENT NO. | : 7,667,589 B2 | |
| APPLICATION NO. | : 10/891894 | |
| DATED | : February 23, 2010 | |
| INVENTOR(S) | : Desmons et al. | |

It is certified that error appears in the above-identified patent and that said Letters Patent is hereby corrected as shown below:

Please delete "110a" on column 4, line 39 and insert --110 a-- therefor.

Please delete "necessarily" on column 8, line 29 and insert --necessarily,-- therefor.

Please delete "26. The article of claim 20, in which uncoupling prevents channeling to the controller a wirelessly received signal via the first port."
on column 12, lines 54-56, in claim 12 and insert
--26. The article of claim 20, in which
uncoupling prevents channeling to the controller a wirelessly received signal via the first port.--
therefore.

Signed and Sealed this

Twenty-eighth Day of September, 2010

David J. Kappos
*Director of the United States Patent and Trademark Office*